(12) United States Patent
Sishtla et al.

(10) Patent No.: US 11,053,950 B2
(45) Date of Patent: Jul. 6, 2021

(54) CENTRIFUGAL COMPRESSOR OPEN IMPELLER

(71) Applicant: Carrier Corporation, Palm Beach Gardens, FL (US)

(72) Inventors: Vishnu M. Sishtla, Manlius, NY (US); William T. Cousins, Glastonbury, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 151 days.

(21) Appl. No.: 16/280,346

(22) Filed: Feb. 20, 2019

(65) Prior Publication Data

US 2019/0285081 A1    Sep. 19, 2019

Related U.S. Application Data

(60) Provisional application No. 62/642,827, filed on Mar. 14, 2018.

(51) Int. Cl.
*F04D 29/28* (2006.01)
*F04D 17/10* (2006.01)
(Continued)

(52) U.S. Cl.
CPC ........... *F04D 29/284* (2013.01); *F04D 17/10* (2013.01); *F04D 29/668* (2013.01); *B33Y 10/00* (2014.12);
(Continued)

(58) Field of Classification Search
CPC ...... F04D 29/284; F04D 29/28; F04D 29/668; F04D 29/66; F04D 29/38; F04D 29/42;
(Continued)

(56) References Cited

U.S. PATENT DOCUMENTS

| 1,341,653 | A | * | 6/1920 | Lee | ........................... | B63H 1/16 |
| | | | | | | 416/193 R |
| 2,390,504 | A | * | 12/1945 | Berger | .................. | F04D 29/681 |
| | | | | | | 415/198.1 |

(Continued)

FOREIGN PATENT DOCUMENTS

| CN | 2702101 Y | 5/2005 |
| CN | 101139996 A | 3/2008 |

(Continued)

OTHER PUBLICATIONS

European Search Report dated Aug. 9, 2019 for European Patent Application No. 19162832.0.

(Continued)

*Primary Examiner* — Igor Kershteyn
*Assistant Examiner* — Joshua R Beebe
(74) *Attorney, Agent, or Firm* — Bachman & LaPointe, P.C.

(57) ABSTRACT

A centrifugal compressor impeller (60; 160) has a hub (62; 162) having a gaspath surface (64; 164) extending from a leading end to a trailing end. A plurality of blades (70A, 70B; 170) extend from the hub gaspath surface and each have: a leading edge (72A, 72B; 172); a trailing edge (74A, 74B; 174); a first face (80A, 80B; 180); a second face (82A, 82B; 182); and a tip (78A, 78B; 178). A plurality of flow splitter segments (120, 122; 320, 322) extend between associated twos of the blades and each spaced from both the hub gaspath surface and the tips of the associated two blades.

19 Claims, 6 Drawing Sheets

(51) Int. Cl.
  *F04D 29/66* (2006.01)
  *B33Y 10/00* (2015.01)
  *F04D 25/06* (2006.01)

(52) U.S. Cl.
  CPC .......... *F04D 25/06* (2013.01); *F05B 2230/22* (2013.01); *F05B 2240/301* (2013.01); *F05B 2240/33* (2013.01); *F05B 2280/1021* (2013.01); *F05B 2280/10304* (2013.01); *F05B 2280/2001* (2013.01); *F05B 2280/4006* (2013.01); *F05B 2280/6014* (2013.01); *F05D 2230/31* (2013.01); *F05D 2260/96* (2013.01)

(58) Field of Classification Search
  CPC .......... F04D 29/40; F04D 29/46; F04D 29/30; F04D 17/10; F04D 25/06; B33Y 10/00; F05B 2230/22; F05B 2240/301; F05B 2240/33; F05B 2280/1021; F05B 2280/10304; F05B 2280/2001; F05B 2280/4006; F05B 2280/6014; F05D 2230/31; F05D 2260/96
  See application file for complete search history.

(56) References Cited

U.S. PATENT DOCUMENTS

| | | | | |
|---|---|---|---|---|
| 2,943,839 | A * | 7/1960 | Birmann | F01D 5/143 415/192 |
| 4,060,337 | A * | 11/1977 | Bell, III | F04D 29/284 416/186 R |
| 4,850,802 | A * | 7/1989 | Pankratz | F01D 5/02 416/213 R |
| 5,105,616 | A * | 4/1992 | Bornemisza | F02C 3/05 60/726 |
| 5,213,473 | A * | 5/1993 | Fiala | F01D 5/048 416/183 |
| 6,004,101 | A * | 12/1999 | Schilling | F01D 5/3007 416/224 |
| 6,280,493 | B1 * | 8/2001 | Eubank | B01D 45/14 55/398 |
| 6,508,626 | B1 | 1/2003 | Sakurai et al. | |
| 6,514,052 | B2 | 2/2003 | Bostwick | |
| 7,628,582 | B2 * | 12/2009 | Kanai | F04D 17/04 415/206 |
| 7,736,129 | B2 | 6/2010 | Matsuo | |
| 7,870,731 | B2 * | 1/2011 | Fledersbacher | F04D 29/4213 60/605.1 |
| 8,079,808 | B2 | 12/2011 | Sconfietti | |
| 8,142,160 | B2 | 3/2012 | Yoo et al. | |
| 8,202,055 | B2 | 6/2012 | Wu et al. | |
| 9,896,937 | B2 | 2/2018 | Dextraze | |
| 2007/0297922 | A1 * | 12/2007 | Kanai | F04D 29/0513 417/321 |
| 2008/0056899 | A1 | 3/2008 | Jiang et al. | |
| 2008/0092538 | A1 * | 4/2008 | Fledersbacher | F01D 17/143 60/598 |
| 2010/0316498 | A1 | 12/2010 | Cahill et al. | |
| 2011/0014052 | A1 | 1/2011 | Hoskins | |
| 2012/0244008 | A1 | 9/2012 | Chang et al. | |
| 2015/0267543 | A1 * | 9/2015 | Gerber | F04D 29/023 416/212 R |
| 2015/0369046 | A1 * | 12/2015 | Roberge | F01D 5/3069 60/805 |
| 2016/0273546 | A1 | 9/2016 | Chan et al. | |
| 2016/0290355 | A1 | 10/2016 | Lin et al. | |
| 2016/0298644 | A1 * | 10/2016 | Parkos, Jr. | F04D 29/324 |

FOREIGN PATENT DOCUMENTS

| | | | |
|---|---|---|---|
| CN | 201786739 U | 4/2011 | |
| CN | 202273916 U | 6/2012 | |
| CN | 205806015 U | 12/2016 | |
| DE | 102005019938 A1 | 11/2006 | |
| EP | 1566549 B1 | 9/2012 | |
| JP | 2013133748 A | 7/2013 | |
| KR | 100548709 B1 | 2/2006 | |
| WO | 2008050915 A1 | 5/2008 | |
| WO | 2013162897 A1 | 10/2013 | |
| WO | WO-2017013053 A1 * | 1/2017 | F01D 5/16 |

OTHER PUBLICATIONS

Indian Examination Report dated May 11, 2020 for Indian Patent Application No. 201914008156.

* cited by examiner

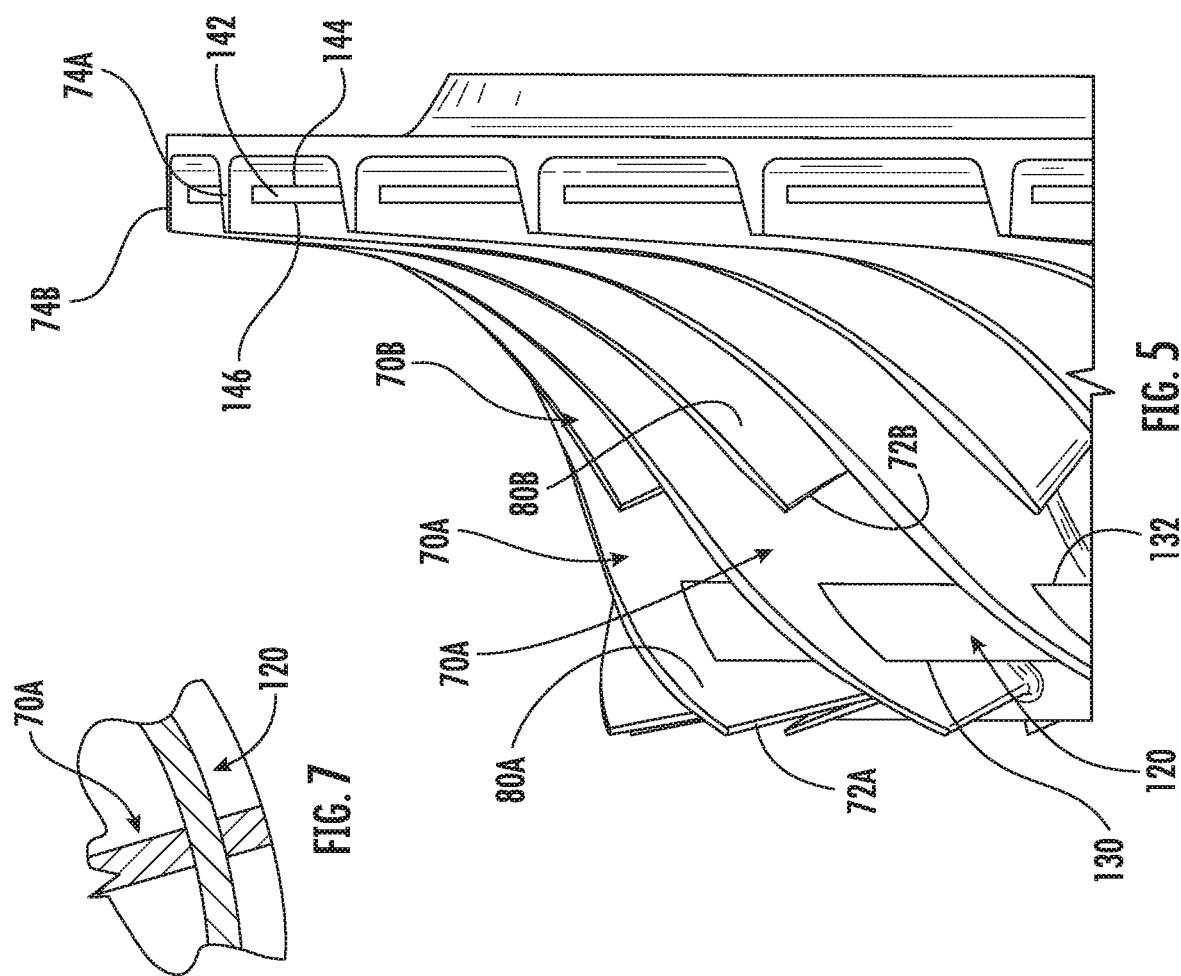
FIG. 5
FIG. 7
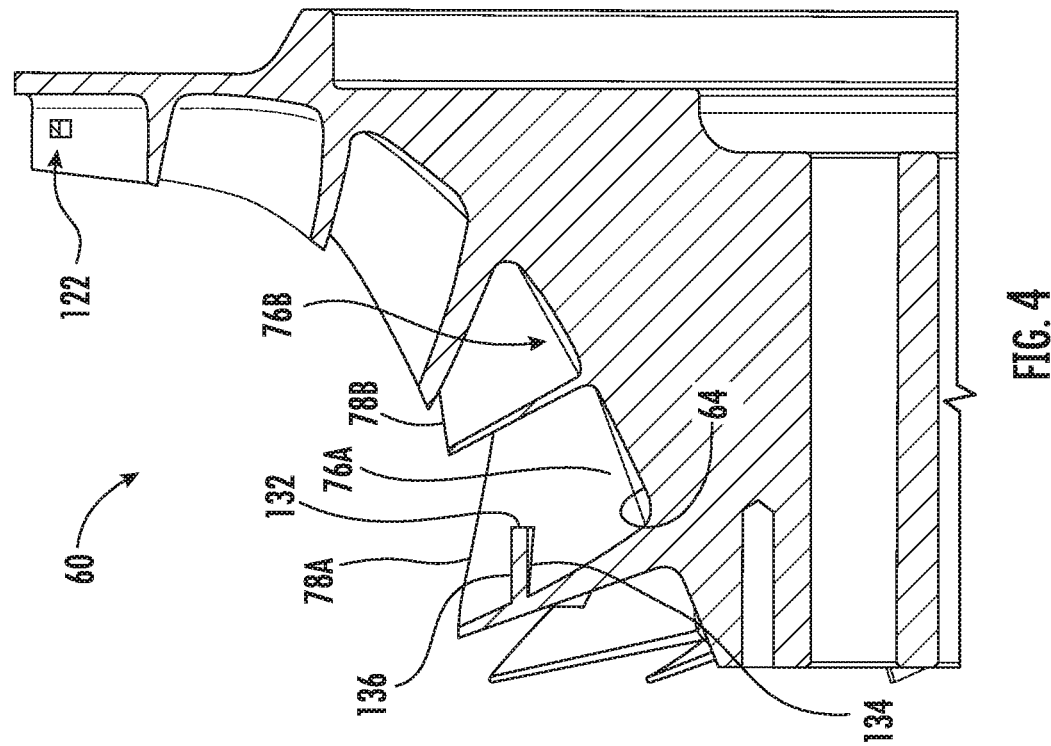
FIG. 4

CENTRIFUGAL COMPRESSOR OPEN IMPELLER

CROSS-REFERENCE TO RELATED APPLICATION

Benefit is claimed of U.S. Patent Application No. 62/642,827, filed Mar. 14, 2018, and entitled "Centrifugal Compressor Open Impeller", the disclosure of which is incorporated by reference herein in its entirety as if set forth at length.

BACKGROUND

The disclosure relates to centrifugal compressors. More particularly, the disclosure relates to centrifugal compressor impeller configurations.

Centrifugal compressors are often used in vapor compression systems (e.g., refrigeration). Several considerations go into impeller design and other aspects of compressor design.

Impellers are broadly characterized in two groups: open or unshrouded impellers; and shrouded impellers. Both groups form the impeller with a hub and vanes (also termed "blades") extending outward from the hub. The hub outer surface extends from an upstream end or nose (axial inlet) axially and then radially outward to a downstream end (radial outlet). Accordingly, the vanes, near the upstream end protrude generally radially outward from the hub and toward the downstream end protrude axially from the hub.

With a shrouded impeller, an integral shroud surrounds the vanes so that the vanes extend across a flowpath between the surface of the hub and a surface of the shroud. Exemplary shrouded impellers are unitarily formed via casting and machining of an alloy. The shroud greatly rigidifies the vanes and reduces tendencies toward vibration. This may allow use of a relatively thinner vane structure than in an equivalent open impeller wherein the vanes are secured only at the hub.

In an open impeller situation, edges of the vanes closely interface with a separate shroud on the compressor. There may be position control between the impeller and shroud to balance loss of efficiency due to leakage against risk of damage from impeller-to-shroud contact.

Open impellers offer certain ease of manufacture considerations. For example, the vanes may be easily machined (either entirely or finish machining of cast-in vanes). Open impellers also allow tailoring of blade geometry for particular end uses. For example, one basic impeller casting may have its blades machined differently (e.g., to different heights) for different compressor models or submodels.

Additionally, several compressor drive configurations are used with centrifugal compressors. In direct drive compressors, the impeller is mounted to a motor shaft. In geared compressors, a transmission intervenes between the motor and the impeller. For example, a geared reduction may have a large gear on the motor shaft mating with a small gear on the impeller shaft. This may be used in large capacity compressor situations wherein impeller rotational speed is low.

Yet other variations include multi-impeller compressors.

SUMMARY

One aspect of the disclosure involves a centrifugal compressor impeller comprising a hub having a gaspath surface extending from a leading end to a trailing end. A plurality of blades extend from the hub gaspath surface and each have: a leading edge; a trailing edge; a first face; a second face; and a tip. A plurality of flow splitter segments extend between associated twos of the blades. Each flow splitter segment is spaced from both the hub gaspath surface and the tips of the associated two blades.

In one or more embodiments of any of the foregoing embodiments, the plurality of flow splitter segments is within an upstream third or a downstream third of a flowpath length from the leading edges to the trailing edges.

In one or more embodiments of any of the foregoing embodiments, the plurality of flow splitter segments is a first plurality of flow splitter segments and the impeller further comprises a second plurality of flow splitter segments extending between the blades and spaced from both the hub gaspath surface and the tips of the blades.

In one or more embodiments of any of the foregoing embodiments, the first plurality of flow splitter segments is within an upstream third of a flowpath length from the leading edges to the trailing edges and the second plurality of flow splitter segments is within a downstream third of said flowpath length from the leading edges to the trailing edges.

In one or more embodiments of any of the foregoing embodiments, the plurality of blades is a first plurality of blades. A second plurality of blades extend from the hub gaspath surface and each have: a leading edge; a trailing edge; a first face; a second face; and a tip. Said leading edges of the second plurality of blades are downstream recessed relative to the leading edges of the first plurality of blades. The plurality of flow splitter segments is upstream of the leading edges of the second plurality of blades.

In one or more embodiments of any of the foregoing embodiments, the plurality of flow splitter segments is a first plurality of flow splitter segments and the impeller further comprises a second plurality of flow splitter segments extending between the blades of the first plurality of blades and the second plurality of blades and spaced from both the hub gaspath surface and the tips of the first plurality of blades and the second plurality of blades.

In one or more embodiments of any of the foregoing embodiments, the hub, the plurality of blades, and the plurality of flow splitter segments are formed as a unitary monolithic metallic casting.

In one or more embodiments of any of the foregoing embodiments, the plurality of flow splitter segments forms a circumferential ring.

In one or more embodiments of any of the foregoing embodiments, the hub and the plurality of blades are formed as a first unitary metallic casting and the circumferential ring is formed separately formed from said first unitary metallic casting.

In one or more embodiments of any of the foregoing embodiments, the hub and the plurality of blades comprise a first alloy and the circumferential ring comprises a second alloy different from the first alloy.

In one or more embodiments of any of the foregoing embodiments, the first alloy is an aluminum alloy; and the second alloy is a titanium alloy.

In one or more embodiments of any of the foregoing embodiments, the hub, the plurality of blades, and the plurality of flow splitter segments are formed as a unitary monolithic glass-filled nylon.

In one or more embodiments of any of the foregoing embodiments, the impeller has an axial inlet and a radial outlet.

In one or more embodiments of any of the foregoing embodiments, the impeller has an axial inlet and an axial outlet.

In one or more embodiments of any of the foregoing embodiments, a compressor comprising the compressor impeller and further comprises a housing having an inlet port and an outlet port; a motor mounted within the housing. Said compressor impeller is coupled to the motor to be driven for rotation about an impeller axis. A shroud faces the tips.

In one or more embodiments of any of the foregoing embodiments, a method for using the compressor comprises running the motor to drive the compressor impeller to drive a flow from the inlet to the outlet wherein at least 25% of the flow passes radially outboard of the plurality of flow splitter segments and at least 25% of the flow passes radially inboard of the plurality of flow splitter segments.

In one or more embodiments of any of the foregoing embodiments, a method for manufacturing the compressor impeller comprises: forming the plurality of flow splitter segments of a first alloy; and forming the plurality of blades of a second alloy different from the first alloy.

In one or more embodiments of any of the foregoing embodiments, the method for manufacturing comprises additive manufacture.

In one or more embodiments of any of the foregoing embodiments, the method for manufacturing comprises additive manufacture of both the plurality of flow splitter segments and the plurality of blades.

In one or more embodiments of any of the foregoing embodiments, a method for manufacturing the compressor impeller comprises additive manufacture of both the plurality of flow splitter segments and the plurality of blades as a unit.

Another aspect of the disclosure involves a centrifugal compressor impeller comprising a hub having a gaspath surface extending from a leading end to a trailing end. A plurality of blades extend from the hub gaspath surface and each have: a leading edge; a trailing edge; a first face; a second face; and a tip. A circumferential ring extends between the blades and is spaced from both the hub gaspath surface and the tips of the blades.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 4 is a partial axial sectional view of the impeller taken along line 4-4 of FIG. 3.

FIG. 5 is a partial side view of the impeller.

FIG. 7 is a partial transverse sectional view of a ring-to-vane intersection on an impeller.

Like reference numbers and designations in the various drawings indicate like elements.

DETAILED DESCRIPTION

Figure 1:
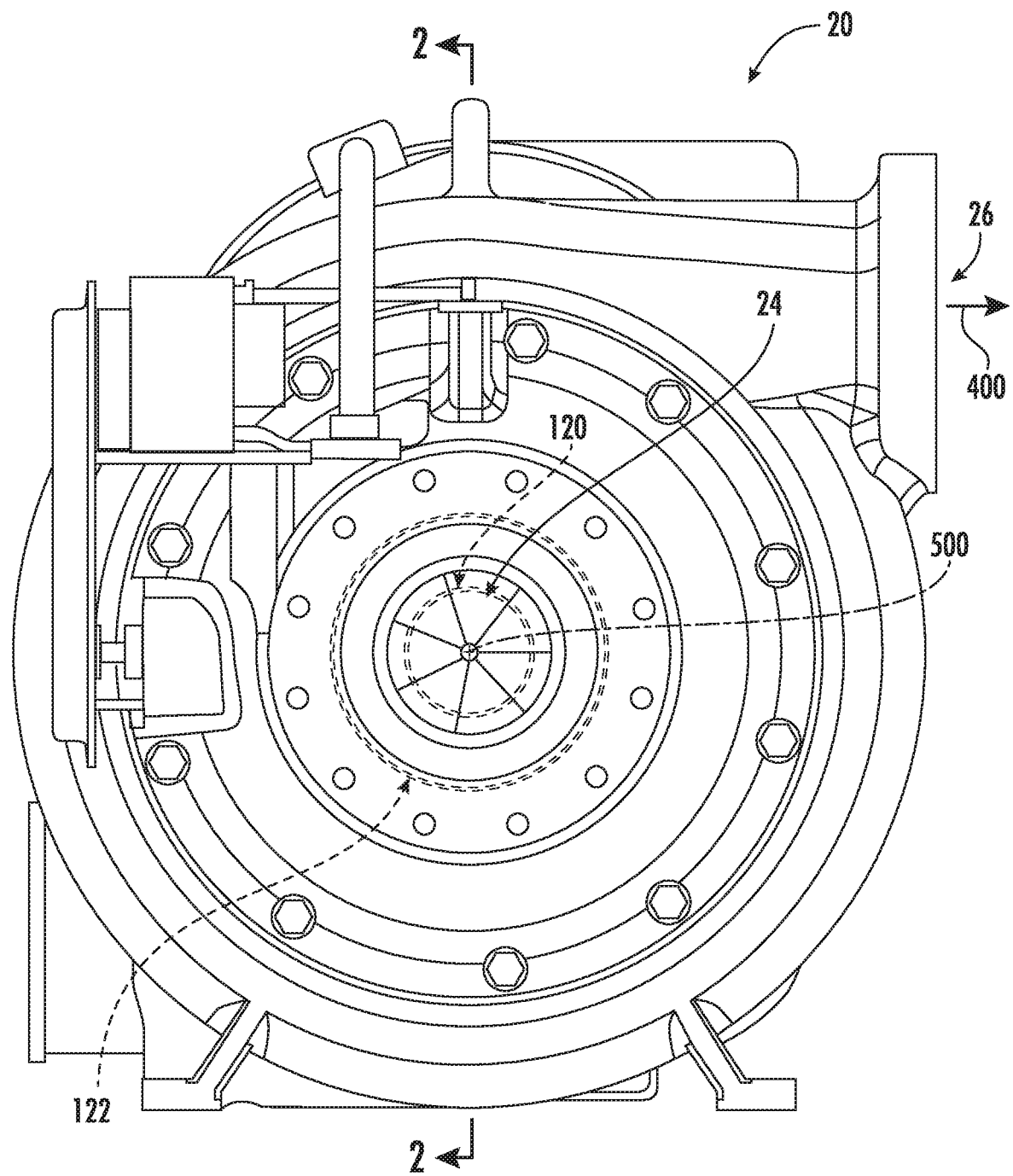
FIG. 1 is a front view of a compressor.

FIG. 1 shows a compressor 20 having a housing or case (assembly) 22 with an inlet or suction port 24 and an outlet or discharge port 26. A flowpath between the suction port and discharge port may compress a vapor flow 400 (FIG. 2).

Figure 2:
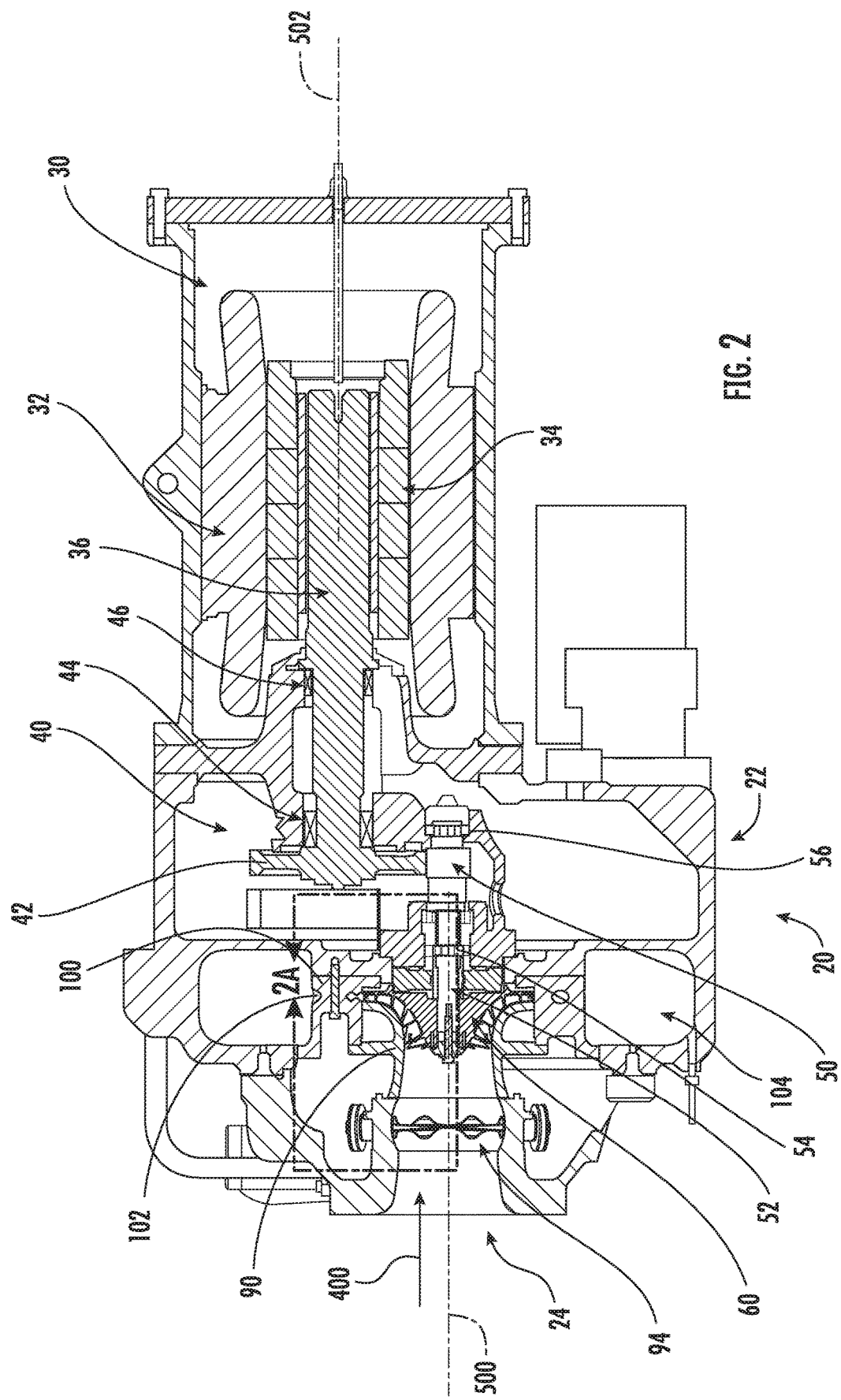
FIG. 2 is a longitudinal section view of the compressor of FIG. 1 taken along line 2-2.
Figure 2A:
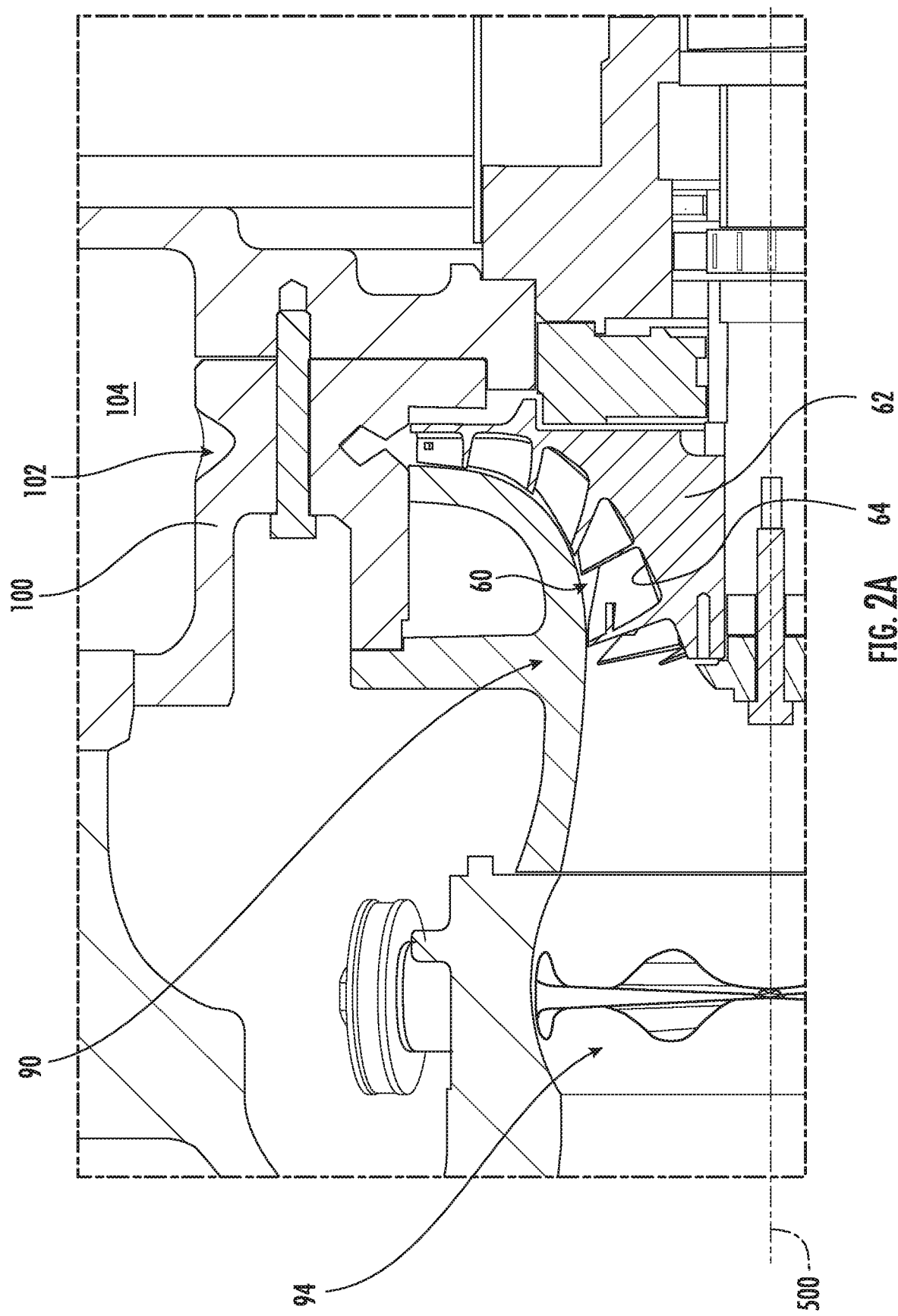
FIG. 2A is an enlarged view of an impeller region of the compressor of FIG. 2.

FIG. 2 shows the compressor 20 as including a motor 30 in a motor case section of the housing. The motor has a stator 32 and a rotor 34. The rotor 34 includes a shaft 36 extending outward to mate with and drive a transmission 40. The exemplary transmission 40 includes a driving gear 42 mated to the shaft 36 to be driven about a shaft axis 502. The exemplary shaft 36 is supported by bearings 44, 46 for rotation about the axis 502. The transmission 40 further includes a driven gear 50 mounted to an impeller shaft 52 held for rotation about an axis 500 by bearings 54 and 56. An impeller 60 is mounted to a forward end portion of the impeller shaft 52. The impeller has a hub 62 having an outboard surface (gaspath surface) 64 (FIG. 2A) along a flowpath through the compressor. An inner diameter (ID) surface of the impeller hub receives the impeller shaft 52.

Figure 3:
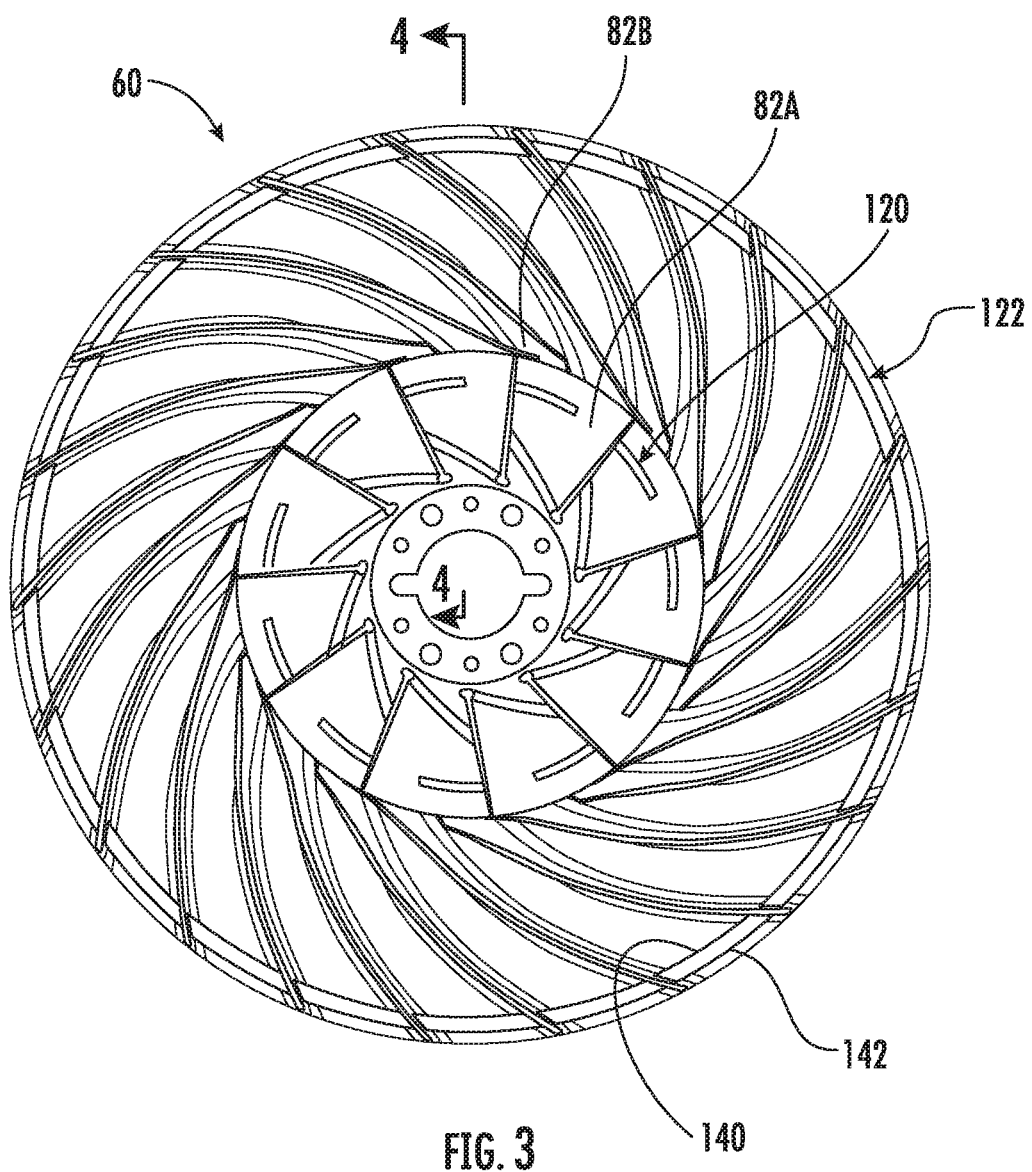
FIG. 3 is a front view of the impeller.

The impeller 60 includes a plurality of vanes (also known as blades) protruding from the surface 64. The exemplary impeller is configured with two sets of interdigitated vanes 70A and 70B (FIG. 5). The exemplary vanes 70A are longer along the flowpath with a leading edge 72A at the inlet end of the impeller. The leading edges 72B of vanes 70B are recessed. Downstream or trailing edges 74A, 74B of the vanes may be at like position along the flowpath. In the illustrated embodiment, the downstream edges extend axially along a radial outlet of the impeller. The vanes have proximal or inboard boundaries at the surface 64 (FIG. 4) and extend to outboard or distal edges 78A, 78B serving as blade tips. The vanes have opposite first surfaces (faces) 80A, 80B and second surfaces (faces) 82A, 82B (FIG. 3). A vane height may be measured as the distance of the edge 78A, 78B measured normal to the surface 64. An alternative parameter of vane height may be the radial span of a vane at the inlet end or the axial span of the vane at the outlet end.

FIG. 2 further shows a fixed shroud 90 and an inlet guide vane array 94 upstream thereof. The guide vanes may be rotated about their respective axes by an actuator (e.g., servomotor or the like). Exemplary actuation involves a single actuator moving all vanes in synchrony via geared or pulley interaction. FIG. 2 further shows a diffuser 100 having diffuser passageways 102 extending between the impeller outlet and a discharge plenum 104 feeding the discharge port.

As so far described, the compressor is illustrative of one example of numerous compressors to which the following teachings may be applied.

In FIG. 3, the illustrated impeller comprises a pair of rings 120, 122. The exemplary rings are circumferential rings extending essentially exactly circumferentially (e.g., not having an axial or radial spiral). The exemplary first ring 120 is in an upstream third of the flowpath along the impeller spaced ahead of the second vanes 70B so as to define segments between adjacent first vanes 70A.

The exemplary ring 120 has a generally rectangular central axial cross-section (FIG. 4) extending from an upstream (leading) edge 130 (FIG. 5) to a downstream (trailing) edge 132. The ring 120 and its segments thus also have an inboard face or surface 134 (FIG. 4) and an outboard face or surface 136. The inboard surface 134 faces and is relatively close to the hub gaspath surface 64. Alternative cross-sections may be more arcuate to conform to bending of the flowpath.

The second ring 122 is within a downstream third of the flowpath length along the impeller. The exemplary second ring 122 also has a generally rectangular cross-section having a leading edge 140 (FIG. 3), a trailing edge 142, an inboard face 144 (FIG. 5), and an outboard face 146. The second ring 122 spans all vanes (thus its segments each extend between one of the first vanes and one of the second vanes).

By recessing the faces 136, 146 of the segments from the edges 78A, 78B, the rings 120, 122 thus each split the flow through the impeller into an inboard portion (between the surface 64 on the one hand and the faces 134 and 144 on the other hand) and an outboard portion (between the shroud on the one hand and the faces 136 and 146 on the other hand). An exemplary recessing may leave at least 10% of a vane height beyond the faces 136 and 146. Thus, the ring segments alternatively may be described as flow splitter segments splitting the flow into inboard and outboard portions.

The presence of the rings 120, 122 may limit resonant behavior of the impeller in a desired speed range. This may have one or more of several consequences including allowing thinner/lighter/more efficient vanes, allowing higher speed operation, allowing reduction in other anti-vibration measures, and improving service life.

The exemplary first ring 120 is shown recessed along the height of the vanes 70A. This recessing allows machining of the edges 78A, 78B to select blade height for a given application even while using one form of impeller precursor (e.g., a raw casting with blade precursors or a machined casting with otherwise fully functional blades already formed at a maximum height). Similarly, the ring 122 is radially recessed from the trailing edges 74A, 74B. This also allows radial trimming of the impeller at the impeller outlet.

The compressor may be made using otherwise conventional or yet-developed materials and techniques. A particular method for manufacturing the integral rings is to sand cast, injection mold, or five axis mill. This may be of a unitary single-alloy casting forming at least a portion of the hub along with the vanes and ring(s). For example, some known impellers feature aluminum alloy cast over a steel hub core/bushing.

Additive manufacturing techniques can be used. Additive manufacturing may be used such as when the ring(s) are made out of a different material than are the impeller hub and vanes (see FIG. 7). In one example, a multi-feed additive manufacturing apparatus (e.g., fused deposition modeling (FDM) or the like) is used with one feed for impeller hub and vane material and another for ring material. Relative to hub/vane material, the ring material may be one or more of a more expensive material, a stronger material, and a less machinable material. For example, consider an aluminum alloy (e.g., majority Al by weight) for the hub/vanes and a titanium alloy (e.g., majority Ti by weight) for the ring(s). In such a process the ring alloy of each ring may form a continuous full annulus through the vanes for hoop strength.

Alternative bimetallic manufacturing involves pre-forming the ring(s) such as by machining and then over-casting the hub/vanes.

Yet alternative manufacture involves non-metallic materials. One example is use of glass filled polymer such as a glass-filled polyamide (e.g., Nylon 12 GF). Grades of Nylon 12 GF are commercially available for laser sintering manufacture techniques. Thus, monolithic additive manufacture of the impeller including the vanes and ring(s) by selective laser sintering (SLS) is a possible technique.

Figure 6:
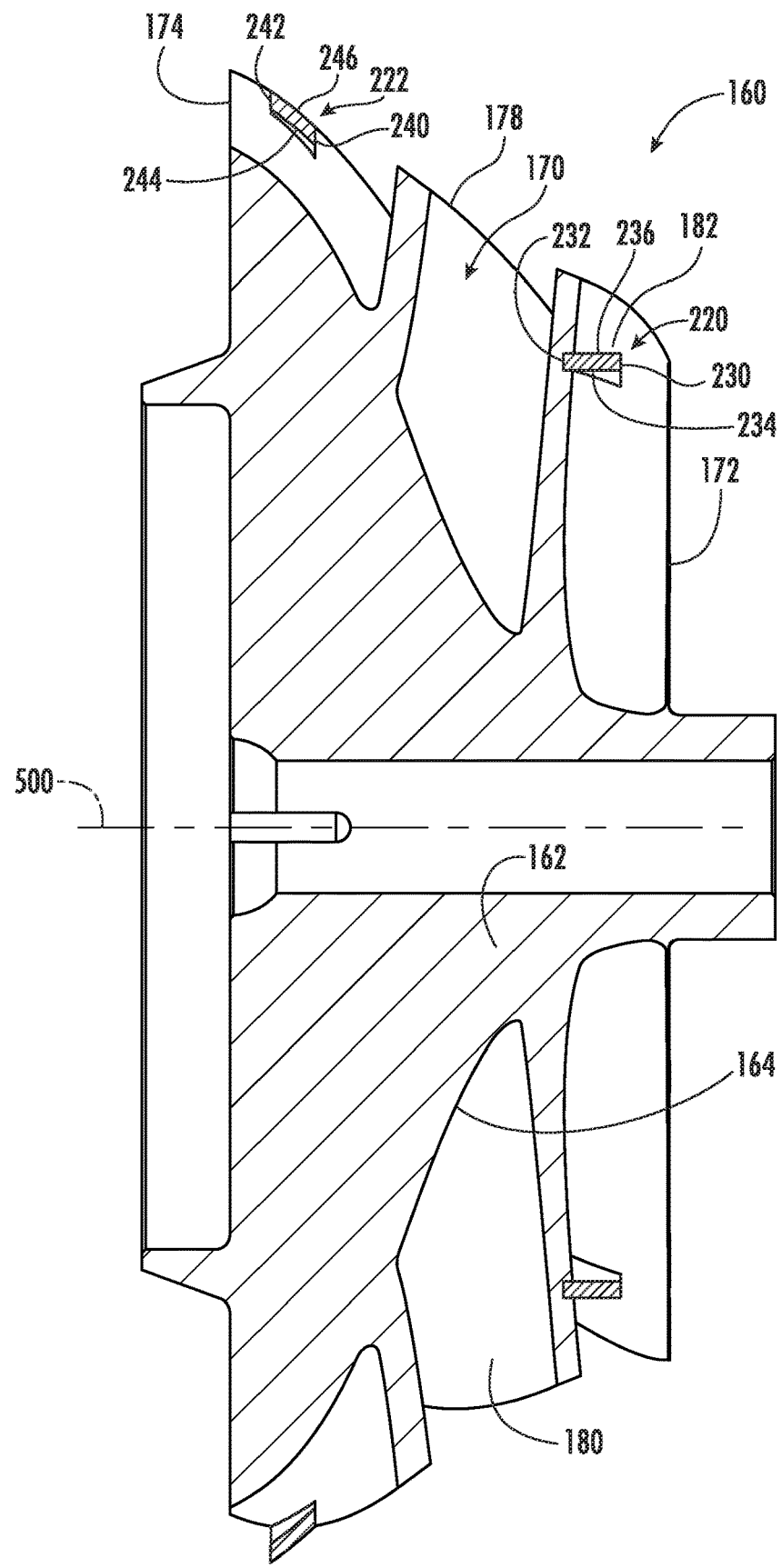
FIG. 6 is a central axial sectional view of a second impeller.

FIG. 6 shows an alternate impeller 160 for a mixed flow compressor wherein the impeller has an axial inlet and an axial outlet. In FIG. 6, the reference numbers for parts equivalent to those shown in FIGS. 3 to 5 are increased by 100. Thus, for example, in FIG. 6 there is a leading edge 240, equivalent to leading edge 140 in FIG. 3. Despite the axial outlet, the gaspath still substantially diverges radially from impeller inlet to impeller outlet. Thus, exemplary gaspath outer diameter at the impeller outlet is still at least about 130% of that at the impeller inlet and the median between the hub surface and vane OD diverges more (e.g., median diameter at the outlet at least about 150% of that at the inlet).

This particular FIG. 6 example has rings 220, 222 formed of a different material than the vanes, but unitary monolithic variants are also possible. The rings 220, 222 and their segments thus have a leading edge 230, 240, a trailing end 232, 242, an inboard face or surface 234, 244, and an outboard face or surface 236, 246. The impeller has a hub 162 with a gaspath surface 164 and vanes 170 extending radially outward therefrom. Two exemplary differences of the impeller 160 relative to the impeller 60 are the axial outlet and the lack of two different lengths of vane 170. The vanes 170 thus each have leading edge 172, trailing edge 174, outboard or distal edge 178, first faces 180 and opposite second faces 182.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A centrifugal compressor impeller (60; 160) comprising:
   a hub (62; 162) having a gaspath surface (64; 164) extending from a leading end to a trailing end;
   a plurality of blades (70A, 70B; 170) extending from the hub gaspath surface and each having:
      a leading edge (72A, 72B; 172);
      a trailing edge (74A, 74B; 174);
      a first face (80A, 80B; 180);
      a second face (82A, 82B; 182); and
      a tip (78A, 78B; 178); and
   a plurality of flow splitter segments (120, 122; 320, 322) extending between associated twos of the blades and each spaced from both the hub gaspath surface and the tips of the associated two blades, wherein:
      the plurality of flow splitter segments comprises a plurality of first flow splitter segments forming a first circumferential ring (120; 320); and
      the plurality of flow splitter segments comprises a plurality of second flow splitter segments forming a second circumferential ring (122; 322).

2. The compressor impeller (60) of claim 1 wherein:
   the plurality of blades is a first plurality of blades (70A);
   a second plurality of blades (70B) extending from the hub gaspath surface and each have:
      a leading edge;
      a trailing edge; a first face;
      a second face; and
      a tip;

said leading edges of the second plurality of blades are downstream recessed relative to the leading edges of the first plurality of blades; and the plurality of first flow splitter segments is upstream of the leading edges of the second plurality of blades.

3. The compressor impeller (60; 160) of claim 2 wherein:
the plurality of second flow splitter segments is spaced from both the hub gaspath surface and the tips of the first plurality of blades and the second plurality of blades.

4. The compressor impeller (60; 160) of claim 1 wherein:
the hub, the plurality of blades, and the plurality of flow splitter segments are formed as a unitary monolithic metallic casting.

5. The compressor impeller (60; 160) of claim 1 wherein:
the first circumferential ring is formed separately from the hub and the plurality of blades.

6. The compressor impeller (60; 160) of claim 5 wherein:
the hub and the plurality of blades are formed as a first unitary metallic casting; and the first circumferential ring is formed separately from said first unitary metallic casting.

7. The compressor impeller (60; 160) of claim 5 wherein:
the hub and the plurality of blades comprise a first alloy; and the first circumferential ring comprises a second alloy different from the first alloy.

8. The compressor impeller (60; 160) of claim 7 wherein:
the first alloy is an aluminum alloy; and the second alloy is a titanium alloy.

9. The compressor impeller (60; 160) of claim 1 wherein:
the hub, the plurality of blades, and the plurality of flow splitter segments are formed as a unitary monolithic glass-filled nylon.

10. The compressor impeller (60) of claim 1 wherein:
the impeller has an axial inlet and a radial outlet.

11. The compressor impeller (160) of claim 1 wherein:
the impeller has an axial inlet and an axial outlet.

12. A compressor (20) comprising the compressor impeller (60; 160) of claim 1 and further comprising:
a housing (22) having an inlet port (24) and an outlet port (26);

a motor (30) mounted within the housing;

said compressor impeller coupled to the motor to be driven for rotation about an impeller axis (500); and a shroud (90) facing the tips.

13. A method for using the compressor of claim 12, the method comprising:

running the motor to drive the compressor impeller (60; 160) to drive a flow from the inlet to the outlet wherein at least 25% of the flow passes radially outboard of the plurality of first flow splitter segments and at least 25% of the flow passes radially inboard of the plurality of first flow splitter segments.

14. A method for manufacturing the compressor impeller (60; 160) of claim 1, the method comprising:
forming the plurality of flow splitter segments of a first alloy; and forming the plurality of blades of a second alloy different from the first alloy.

15. The method of claim 14 comprising additive manufacture.

16. The method of claim 14 comprising additive manufacture of both the plurality of flow splitter segments and the plurality of blades.

17. A method for manufacturing the compressor impeller (60; 160) of claim 1, the method comprising:
additive manufacture of both the plurality of flow splitter segments and the plurality of blades as a unit.

18. A centrifugal compressor impeller (60; 160) comprising:
a hub (62; 162) having a gaspath surface (64; 164) extending from a leading end to a trailing end;

a plurality of blades (70A, 70B; 170) extending from the hub gaspath surface and each having:
a leading edge (72A, 72B; 172); a trailing edge (74A, 74B; 174); a first face (80A, 80B; 180);

a second face (82A, 82B; 182); and a tip (78A, 78B; 178); and a plurality of flow splitter segments (120, 122; 320, 322) comprising pairs of a first flow splitter segment (120; 320) and second flow splitter segment (122; 320), each pair extending between associated twos of the blades and each spaced from both the hub gaspath surface and the tips of the associated two blades, wherein:
the plurality of flow splitter segments (120, 122; 320, 322) is entirely within an upstream third or a downstream third of a flowpath length from the leading edges to the trailing edges.

19. The compressor impeller (60; 160) of claim 18 wherein:
the first flow splitter segments (120; 320) are entirely within said upstream third and the second flow splitter segments (122; 322) are entirely within said downstream third.

* * * * *